United States Patent [19]

Vaughan

[11] Patent Number: 5,544,003
[45] Date of Patent: Aug. 6, 1996

[54] PORTABLE ELECTRICAL DISTRIBUTION PANEL

[76] Inventor: Joe L. Vaughan, 920 Windermere, Moore, Okla. 73160

[21] Appl. No.: 398,781

[22] Filed: Mar. 6, 1995

[51] Int. Cl.⁶ .................................................. H02B 1/04
[52] U.S. Cl. ..................... 361/625; 248/129; 307/150; 361/602
[58] Field of Search ..................... 434/365, 379; 248/129, 27.1; 307/112, 113, 147, 150; 361/42, 600–602, 622, 625, 627, 634, 807, 809, 826–828, 829, 832

[56] References Cited

U.S. PATENT DOCUMENTS

| | | | |
|---|---|---|---|
| 2,572,617 | 10/1951 | Haury | 361/627 |
| 2,778,957 | 1/1957 | Fuchs | 307/112 |
| 3,154,358 | 10/1964 | Blasch | 312/209 |
| 3,631,324 | 12/1971 | Jones | 317/99 |
| 3,694,729 | 9/1972 | Jones | 307/150 |
| 3,786,312 | 1/1974 | Roussard | 317/112 |
| 4,318,156 | 3/1982 | Gallagher | 361/358 |
| 5,111,127 | 5/1992 | Johnson | 320/2 |

Primary Examiner—Gerald P. Tolin
Attorney, Agent, or Firm—Dougherty, Hessin, Beavers & Gilbert

[57] ABSTRACT

A portable power distribution panel for disposition in a sealed, isolated space to receive primary power input from an external source and to distribute reduced or secondary voltage operating power to each of a plurality of output power receptacles while including a circuit breaker with ground fault indicator in each respective power output circuit.

1 Claim, 2 Drawing Sheets

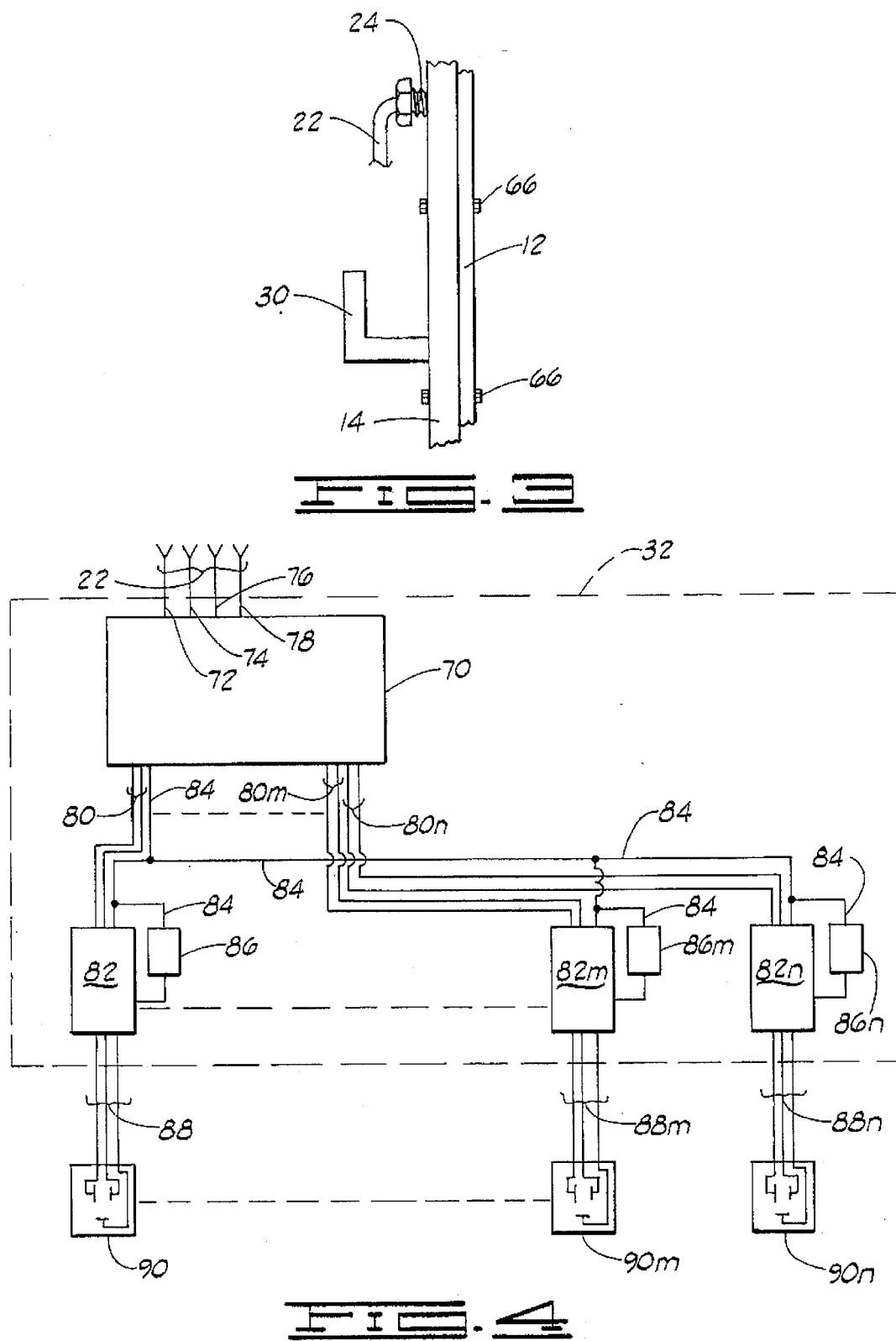

PORTABLE ELECTRICAL DISTRIBUTION PANEL

BACKGROUND OF THE INVENTION

1. Field of the Invention

The invention relates generally to electrical distribution networks and, more particularly but not by way of limitation, it relates to an improved distribution panel that embodies particular design facets and portability.

2. Description of the Prior Art

The prior art includes a great many types of electrical matter which include central distribution panels or the like. However, no prior art was found that teaches a portable distribution panel that satisfies certain aspects of electrical supply for provision to quarantine or isolation spaces that would normally exclude electrical source installations.

SUMMARY OF THE INVENTION

The present invention relates to an improved form of power distribution panel wherein the panel is constructed of highly impervious insulative material mounted on a frame that includes roller casters for portability. A heavy duty main power cord provides input from a suitable power source to the distribution panel and main breaker and, if required, to a main power transformer. Output is then provided from the main breaker to a plurality of individual GFI protected secondary breakers and then to the respective grounded power receptacles. Each of the power receptacles may be utilized to provide energization to a selected tool and/or appliance around the isolation area.

Therefore, it is an object of the present invention to provide an electrical source for an isolation area that is safe and reliable.

It is also an object of the invention to provide a portable electrical source that may be utilized for energization of the various electrical tools, appliances, pumps, blowers and the like that must be utilized within an asbestos removal area.

Finally, it is an object of the present invention to provide a large capacity primary power station that may be wheeled from one work area to another to provide rapid, safe connection.

Other objects and advantages of the invention will be evident from the following detailed description when read in conjunction with the accompanying drawings which illustrate the invention.

BRIEF DESCRIPTION OF THE DRAWINGS

FIG. 3 is a side view in elevation of a portion of the distribution panel shown in cutaway; and FIG. 4 is a schematic diagram of the distribution panel wiring.

DETAILED DESCRIPTION OF THE INVENTION

Figure 1:
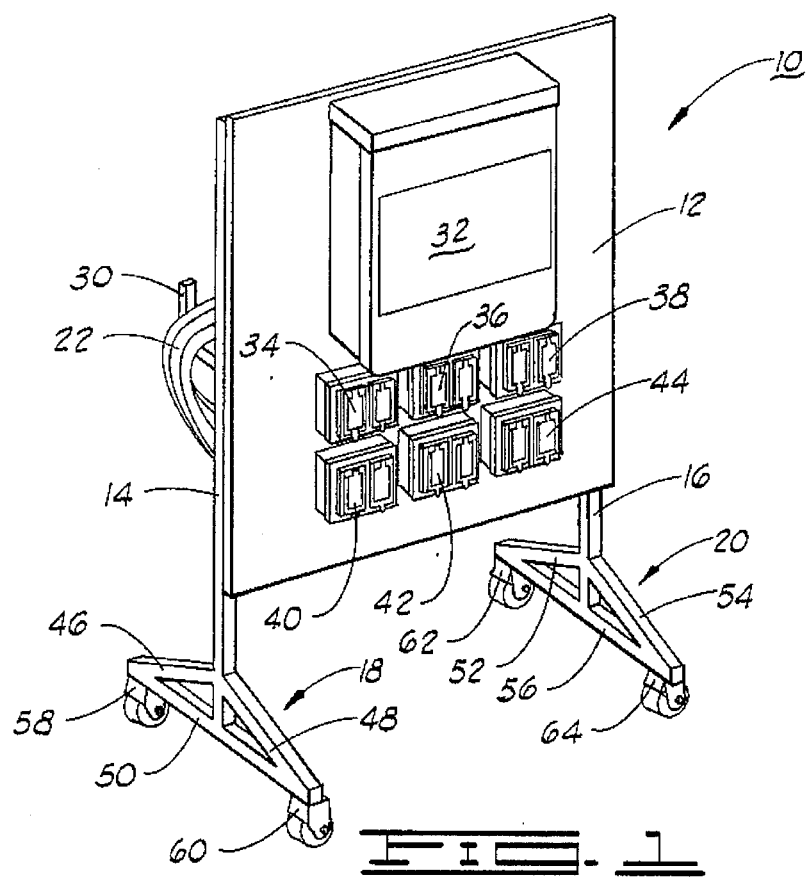
FIG. 1 is a view in perspective of the portable distribution panel of the present invention.
Figure 2:
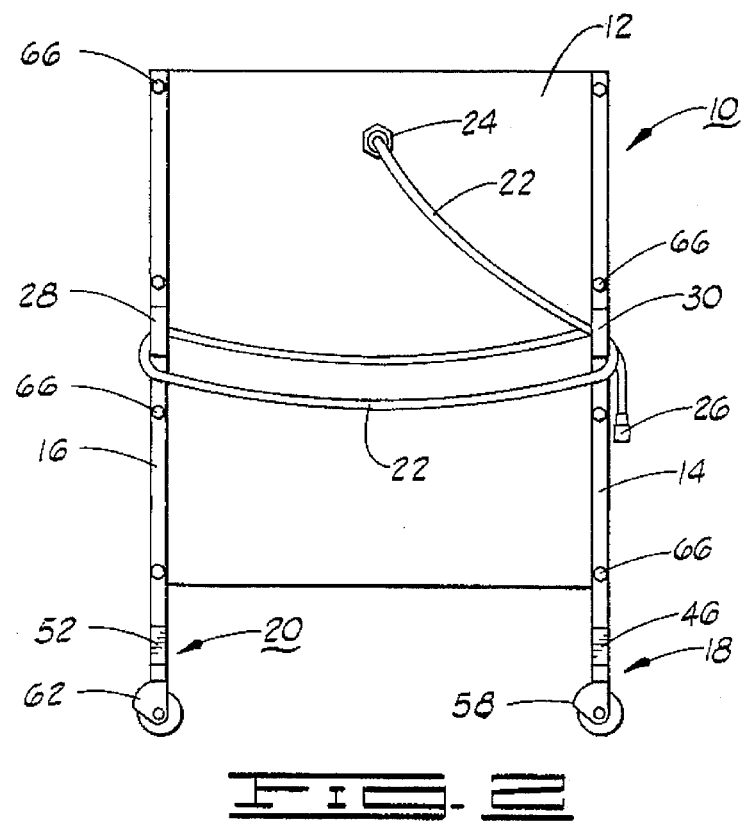
FIG. 2 is a rear view in elevation of the distribution panel.

Referring to FIG. 1, a portable distribution panel 10 consists of a mounting panel 12 secured on opposite side frame members 14 and 16, which are supported on respective wheel assemblies 18 and 20. Referring also to FIG. 2, a main power connector 22 is connected to a feed-through connection 24 and extends a length of power cord 22 to terminate in an electrical power connector 26. The length of power cord 22 may be stored by winding around opposite side angular horns 28 and 30 which are secured on respective frame members 16 and 14.

The mounting panel 12 is formed from suitable insulative material that has requisite structural rigidity. In present design, the mounting panel 12 is made from one-half inch marine plywood that is suitably painted or covered with a non-conductive coating. The electrical equipment may then be bolted through mounting panel 12 for affixture. Thus, such as a 100 ampere weatherproof breaker box 32 is secured centrally at the upper portion of panel 12. The breaker box 32 connects primary power from feed-through 24 to a 100 ampere main breaker and twelve individual circuit breakers with ground fault indicator protection, as will be further described below. Six double gang weatherproof receptacle boxes 34, 36, 38, 40, 42 and 44 are suitably affixed on the lower half of mounting panel 12. Each of the outlet boxes is preferably rated for 110 volt supply. The circuit breaker box 32 and receptacle boxes 34–44 are each secured by bolt-through affixture on the mounting panel 12.

Each of the frame members 14 and 16 are similarly constructed. The frame member 14 is constructed of one inch square steel tubing and all joints are wire-welded (as opposed to stick-welding) to construct each frame member. Thus, frame member 14 includes lateral shoulder bars 46 and 48 which are each secured to a base bar 50. In like manner, the opposite frame member 16 is welded to lateral shoulder bars 52 and 54 as secured on a base bar 56. Heavy duty casters 58, 60, 62 and 64 are secured to opposite ends of respective base bars 50 and 56. For portable maneuverability the casters are selected so that two casters are swivel and two casters are fixed on the respective wheel assemblies 18 and 20.

The storage horns 28 and 30 are wire-welded on respective frame members 16 and 14 at a mid-height. Each of the frame members 16 and 14 is affixed by means of quarter inch bolts to the mounting panel 12. A steel tubing cross member may be welded between frame members 14 and 16 if so desired; however, such cross brace is not really necessary since the rigidity of the mounting panel 12 is sufficient to provide the necessary structural integrity.

Referring to FIG. 4, the main power connector 22 input from the main power source is a four-conductor cable capable of handling high amperage current flow. Preferably, the connector 22 is No. 2 gauge wire, four wire conduit that is capable of supplying either three-phase or single-phase main power input to the main power box 70. The power box 70 includes a 100 ampere main breaker connected to the power connector 22 which consists of three power wires 72, 74 and 76 as well as a ground wire 78. Optionally, depending upon power input, the main power box 70 will also include a selected transformer to step down the one or more phases of input primary power to the secondary voltage, i.e., 110 volt A-C.

The 110 volt A-C is then available on each pair 80 through 80n of wires from the output of main power box 70 to respective ones of the reduced (secondary) voltage circuit breakers 82 through 82n. A ground connector lead 84 is connected between the output of main power box 70 and each respective one of the circuit breakers 82 through 82n. In addition, the ground connector 84 is connected to each of the ground fault indicator devices 86 through 86n that are connected in parallel with the respective circuit breakers 82 through 82n.

Each of the output power connections 88 through 88*n* is connected to respective three prong receptacles 90 through 90*n*. The output receptacles 90 through 90*n* are disposed in pairs within the respective double gang boxes 34 through 44 (see FIG. 1) as mounted on the lower half of mounting panel 12.

In one particular type of operation, the output receptacles 90 through 90*n* are all 110 volt A-C outlets which serve variously for energizing equipment that is used in and around a sealed off location. For example, in carrying out asbestos removal from a building, the removal work site is first sealed off from adjacent rooms and environs whereupon various electrical appliances are utilized in the removal operation.. The outlets 90 through 90*n* of mounting panel 12 serve to energize the various appliances as the portable distribution panel 10 can actually be moved into the sealed-off space to act as the primary power source. All lights, air blowers and electrical cutters are energized from the distribution panel 10, as are the secondary implements which include shower and cleansing pumps and other more specialized electrical tools and appliances.

The foregoing discloses a portable electric distribution panel that enables a primary source to be disposed within a sealed off space. The main power connector 22 may pass through a sealed feed-through into the sealed space whereupon all operating equipment as well as power lines and the like are sealed within the enclosed space so that no articles of dust or other foreign matter can be exchanged between the isolated space and its exterior environs. The distribution panel can also be quickly disconnected and moved to a next succeeding work space wherein the removal operation must be carried out, and such movement is carried out with a minimum of effort and wasted time.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A portable power panel for multiple receptacle electrical distribution from a primary power source, comprising:

an insulative mounting panel;

a support structure having said mounting panel secured thereon;

plural ground-contacting wheel assemblies affixed to said support structure;

a main circuit breaker secured on said mounting panel and receiving input from said primary power source;

a plurality of secondary circuit breakers secured on said mounting panel and connected to receive input power from said main circuit breaker and to provide a plurality of secondary power outputs;

a plurality of power receptacles secured on said mounting panel and energized by respective ones of said secondary power outputs;

a ground connector lead interconnecting all of said main circuit breaker, said plurality of secondary circuit breakers and said plurality of power receptacles; and a plurality of ground fault indicator circuits connected in parallel between each of said plurality of secondary circuit breakers and said ground connector lead.

\* \* \* \* \*